United States Patent [19]

Thomas

[11] Patent Number: 4,655,521
[45] Date of Patent: Apr. 7, 1987

[54] MULTICOMPONENT TELEPHONE BLOCK ACCESS SYSTEM

[75] Inventor: Stephen M. Thomas, Torrington, Conn.

[73] Assignee: The Siemon Company, Watertown, Conn.

[21] Appl. No.: 798,860

[22] Filed: Nov. 15, 1985

[51] Int. Cl.⁴ .......................................... H01R 27/00
[52] U.S. Cl. ........................... 339/31 R; 339/103 R; 339/176 M; 339/156 R; 339/208
[58] Field of Search ............... 339/31 R, 99 R, 103 R, 339/107, 156–159, 163, 176 M, 206–208

[56] References Cited

U.S. PATENT DOCUMENTS

| | | | |
|---|---|---|---|
| 4,057,879 | 11/1977 | Eigenbrode | 339/91 R |
| 4,108,527 | 8/1978 | Douty et al. | 339/107 |
| 4,585,290 | 4/1986 | Knickerbocker et al. | 339/156 R |

Primary Examiner—Neil Abrams
Attorney, Agent, or Firm—Fishman & Dionne

[57] ABSTRACT

A system comprised of a plurality of interlocking snap-on parts which are adapted to form a plurality of configurations for accessing connectors on telephone and related terminal blocks for a multiplicity of applications is presented. The present invention is comprised of essentially six or seven molded parts including two and four position body portions; brackets for holding modular jacks, the brackets attaching to the body portions; interlocks or end stack grommets which interconnect pairs of body portions; and a two part strain and relief plug which receive and retain cables entering and exiting the body portions of the present invention.

33 Claims, 26 Drawing Figures

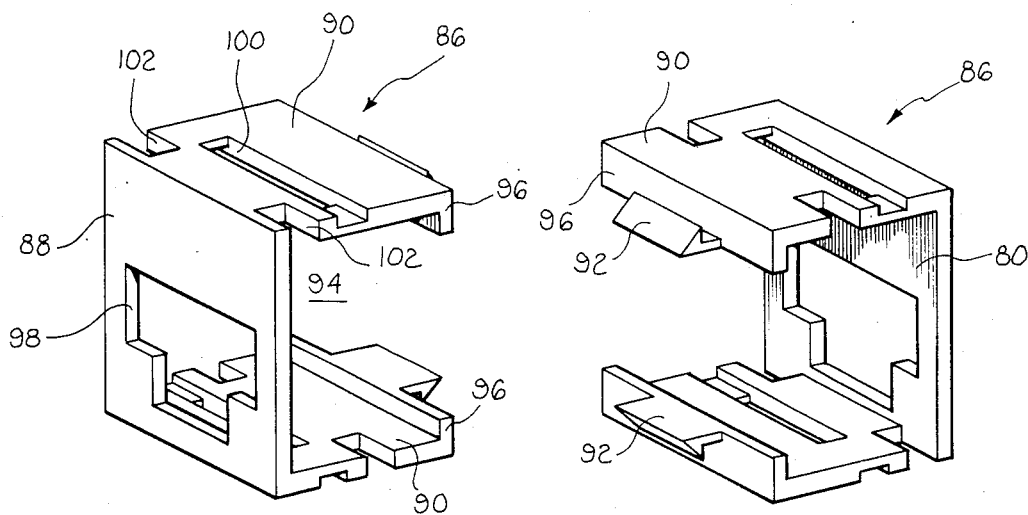
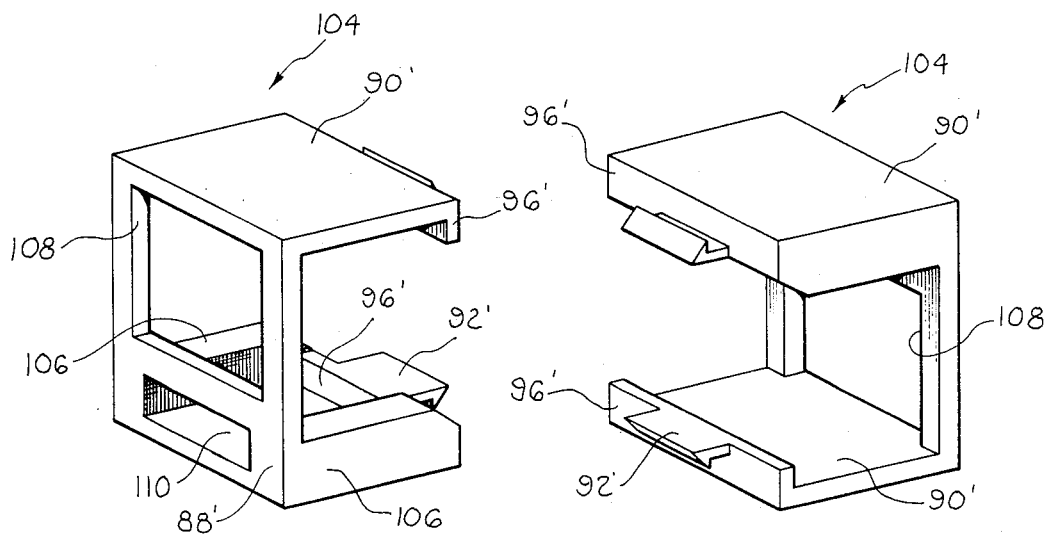
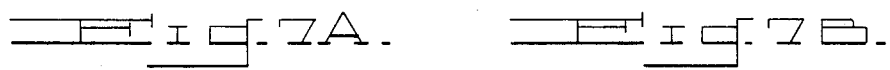

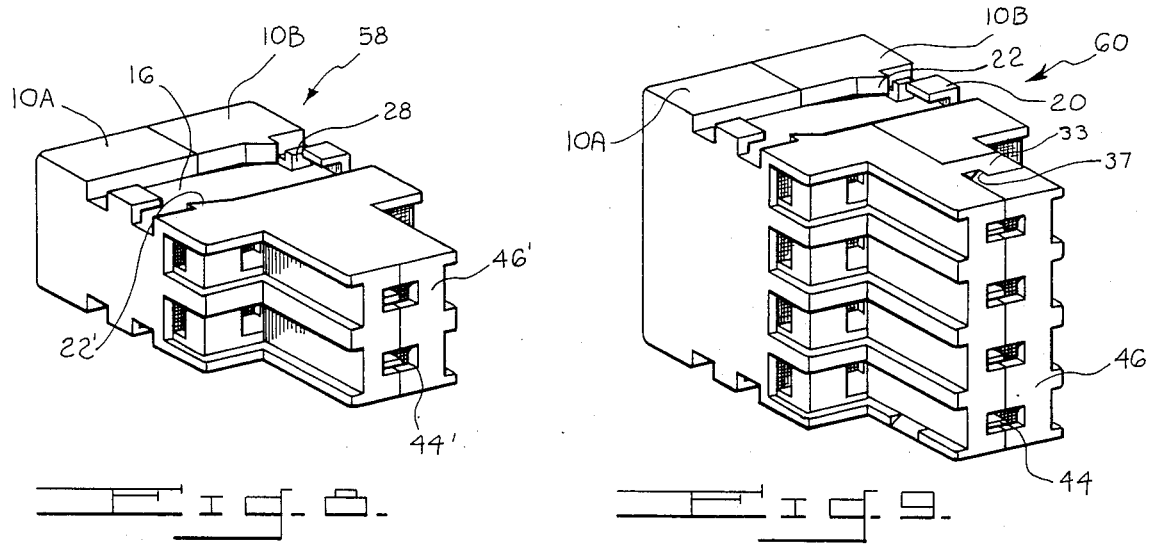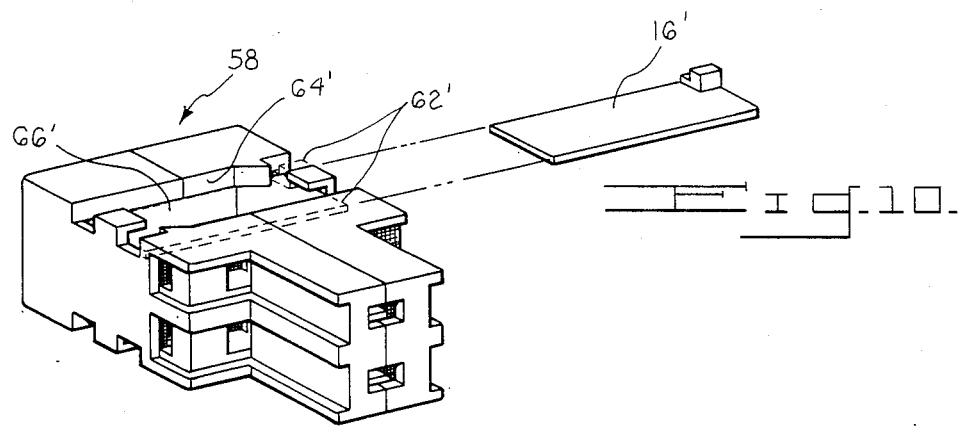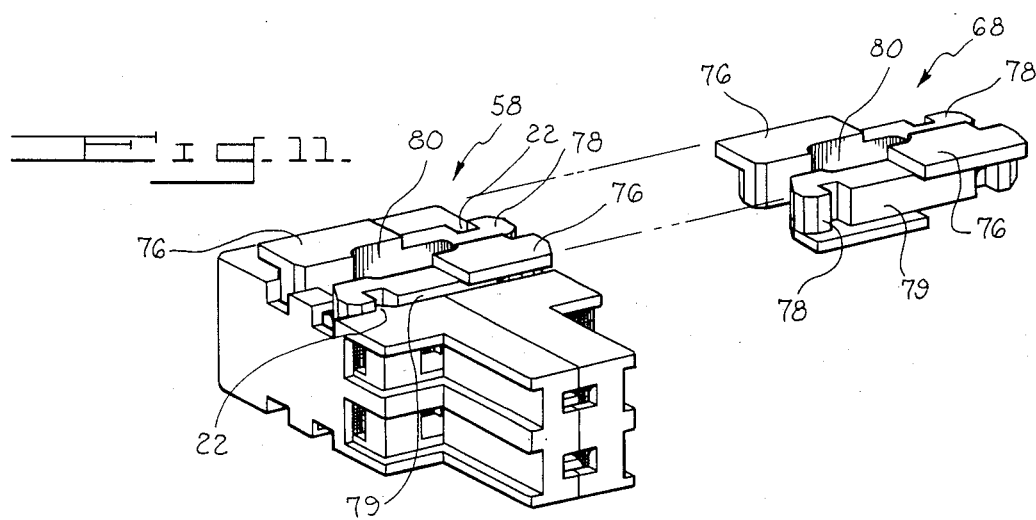

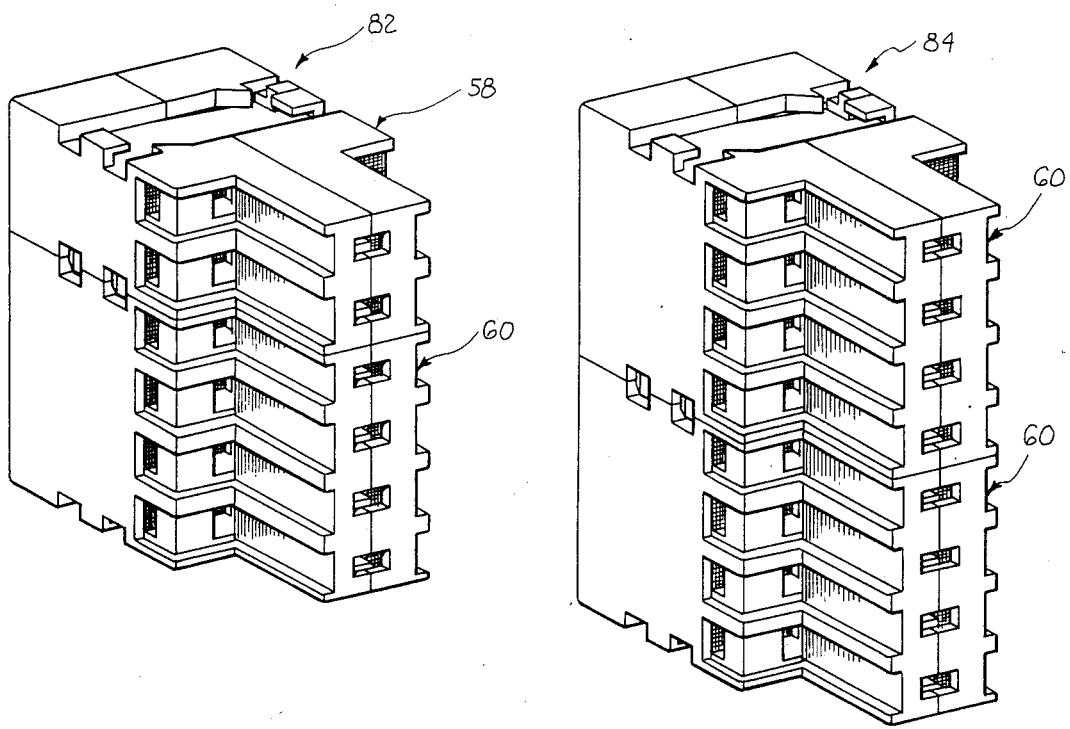
Fig.12. Fig.13.
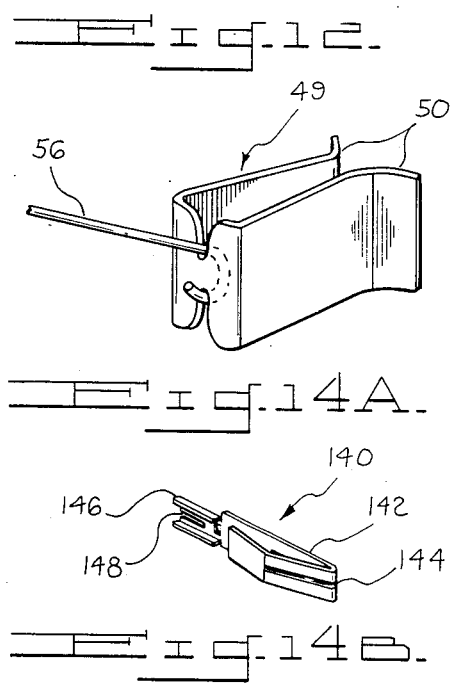
Fig.14A.
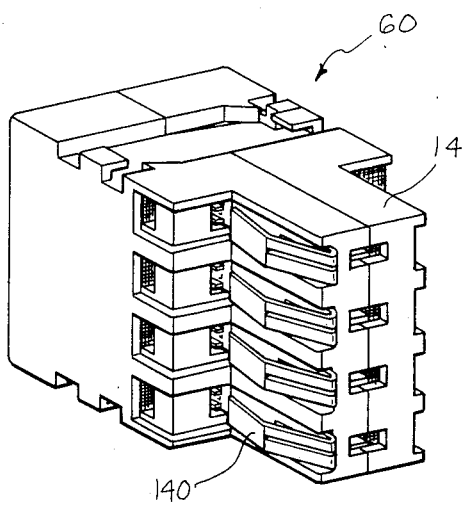
Fig.14B.
Fig.15.

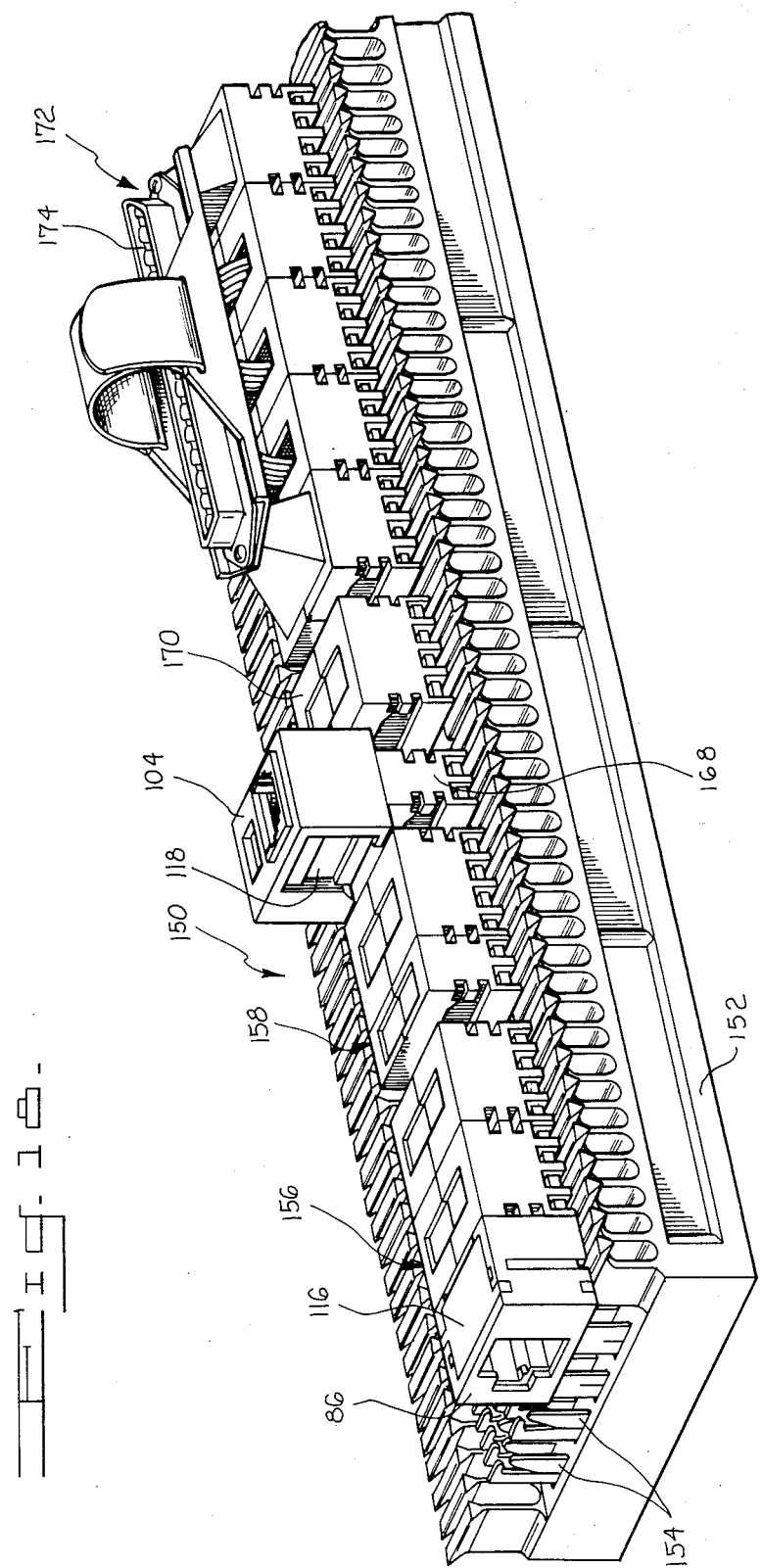

MULTICOMPONENT TELEPHONE BLOCK ACCESS SYSTEM

BACKGROUND OF THE INVENTION

This invention relates to a modular multicomponent access system for use in the telephonic and related industries More particularly, this invention relates to a new and improved system for accessing and testing the wiring of a telephone terminal block of the type having a plurality of connectors extending therefrom such as, for example, type 66 quick-connect type terminals. This system is comprised of a plurality of interlocking snap-on parts which are adapted to form an almost limitless number of configurations which access connectors on terminal blocks.

In the communications industry, and more particularly in the telephone industry, terminal blocks having a plurality of clip-type electrical connectors protruding therefrom are in common use. One such terminal block is the well known Type 66 quick connect block.

A typical prior art method of accessing the electrical connections in such terminal blocks is to attach the testing wires leading from the electronic testing or other apparatus which is to be accessed to the electrical connectors of the block, by suitable clips, i.e., alligator clips. It should be appreciated that this is time consuming and is subject to human error. Thus, alligator clips of this type may create problems such as accidental shorting across terminals or intermittent test connections.

Another prior art apparatus which accesses a block for testing involves a test block which is the same size as the entire block to be tested. This test block has an array of contact elements that are force fitted over the connector elements of the terminal block, and the test block is then secured to the terminal block by clamping arms and a clamping screw. The arms extend into openings in the terminal block and the clamping screw is torqued through the arms to load the test block against the terminal block. This test apparatus is bulky and cumbersome, both to mount and dismount. Furthermore, because of the force fit of test contacts over the connector elements of the terminal block, contact can only be made with every other connector in a row because of space limitations. Thus, individual rows cannot be tested (the entire terminal block must be tested as a unit), and even then, only half the connectors in any row are actually tested.

Still another prior art testing device is disclosed in U.S. Pat. No. 4,293,174, which is assigned to the assignee hereof and incorporated herein by reference. U.S. Pat. No. 4,293,174 describes a testing assembly comprising a plurality of pistons and piston rods within a plurality of chambers, each piston being connected to a conductive grommet and a resilient conductive spring. The assembly is then mounted on protruding connectors or terminals of the type hereinabove discussed via the chambers wherein electrical contact between the pistons and terminals is effected. However, while the testing device disclosed in U.S. Pat. No. 4,293,174 is suitable for its intended purposes, it does not easily afford interconnection with standardized modular plugs; and it must be held in place during use.

U.S. patent application Ser. No. 634,816, now U.S. Pat. No. 4,585,290, which is also assigned to the assignee hereof and incorporated herein by reference, relates to a novel test adapter for insertion directly on a telephone terminal block of the type having a plurality of connectors extending therefrom such as, for example, a type 66 quick connect terminal block. The test plug adapter of the prior application is comprised of a compact insulative housing having a plurality of apertures therethrough, the apertures leading into cavities capable of communicating with, for example, type 66 quick connect terminals. Each cavity within the housing of the adapter has means for retaining a bridge clip which firmly holds the bridge clip therein. The bridge clips are connected, via wire conductors, to a standard modular jack. Preferably, the bridge clip is of the "quick connect" type which permits quicker and easier assembly and disassembly, both in manufacturing and in the field. When the test adapter of U.S. Pat. No. 4,585,290 is mounted on the terminals of a connector block, the terminals are inserted through the apertures into the cavities whereupon the bridge clips therein effect electrical and mechanical contact between the terminals of the block and the modular jack. Thereafter, a test phone or other test equipment adapter having a standard modular plug may be used in conjunction therewith.

While suitable for its intended purposes, the modular test adapter of U.S. Pat. No. 4,585,290 has several disadvantages and deficiencies. For example, individual and separate test adapters of the prior application are necessary for two, four, six or eight wire contacts. As a result, the manufacturer must produce, and the end user must inventory, four different test adapters at all times, which can be expensive and burdensome. Also, the test adapters of the prior application are not well suited for effecting electrical connections with adjacent lateral rows of terminals from a connector block (only vertical rows); and are not adapted to interface with a plurality of modular jacks or other non-modular connectors. End to end stacking of the prior art adapters is also limited due to the bulky housing and the housing configuration.

SUMMARY OF THE INVENTION

The above and discussed and other problems of the prior art are overcome or alleviated by the multicomponent telephone block access system of the present invention. In accordance with the present invention, a system comprised of a plurality of interlocking snap-on parts which are adapted to form an almost limitless number of configurations for accessing connectors on terminal blocks for a myriad of applications is provided. In fact, the present invention will functionally duplicate many other existing connectors simply by building or assembling an appropriate configuration. As will be discussed in greater detail hereinafter, the multicomponent access system of the present invention is an improvement upon and overcomes many of the deficiencies discussed above with relation to the modular test adapter of U.S. Pat. No. 4,585,290. Moreover, the present invention provides many features and performs many functions never even contemplated by the modular test adapter of U.S. Pat. No. 4,585,290.

The present invention is comprised of essentially six or seven molded parts including two and four position body portions; brackets for holding modular jacks, the brackets attaching to the body portions; interlocks or end stack grommets which interconnect pairs of body portions; and a two part strain and relief plug which receive and retain cables entering and exiting the body portions of the present invention. It will be appreciated and understood more clearly from the following detailed description that these several components may be interconnected in a variety of ways to forms thousands of different assemblies for accessing telephone connector blocks and performing important testing and similar functions.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES:

FIGS. 6A and 6B are front and back perspective views of a bracket adapted to hold an eight position modular jack and which is adapted to attach to the body portions of FIGS. 1 and 2;

FIGS. 7A and 7B are front and back perspective views of a bracket adapted to hold a two, four or six position modular jack and which is adapted to attach to the body portions shown in FIGS. 1 and 2;

FIG. 8 is a perspective view of a two position body formed from the identical body portions of FIGS. 2A and 2B;

FIG. 9 is a perspective view of a four position body formed from the identical body portions of FIGS. 1A and 1B;

FIG. 10 is a perspective view of the two position body of FIG. 8 with a break-off tab being removed therefrom to expose a through-hole;

FIG. 11 is a perspective view of the two position body of FIG. 10 with an interconnecting grommet being snapped onto the exposed through-hole left by the break-off tab;

FIG. 12 is a perspective view of a six position body formed by the two position and four position bodies of FIGS. 8 and 9;

FIG. 13 is an eight position body formed by a pair of four position bodies of FIG. 9;

FIG. 14A is a perspective view of a bridge clip for forming electrical connections in accordance with the present invention;

FIG. 14B is a perspective view of a side wipe contact for forming electrical connections in accordance with the present invention;

FIG. 15 is a perspective view of the four position body of FIG. 9 having the side wipe contacts of FIG. 14B inserted therein;

FIG. 18 is a perspective view of a telephone connector block having electrical connectors extending therefrom with a plurality of bodies and brackets in accordance with the present invention attached thereto.

DESCRIPTION OF THE PREFERRED EMBODIMENT

The multicomponent access system for accessing and testing the wiring of a telephone terminal block in accordance with the present invention is comprised of a plurality of interlocking snap-on parts which are adapted to form an almost limitless number of configurations depending upon the application. This access system is essentially comprised of six or seven individual component parts including body portions, brackets, interlock grommets and strain relief plugs.

Figures 1A, 1B:
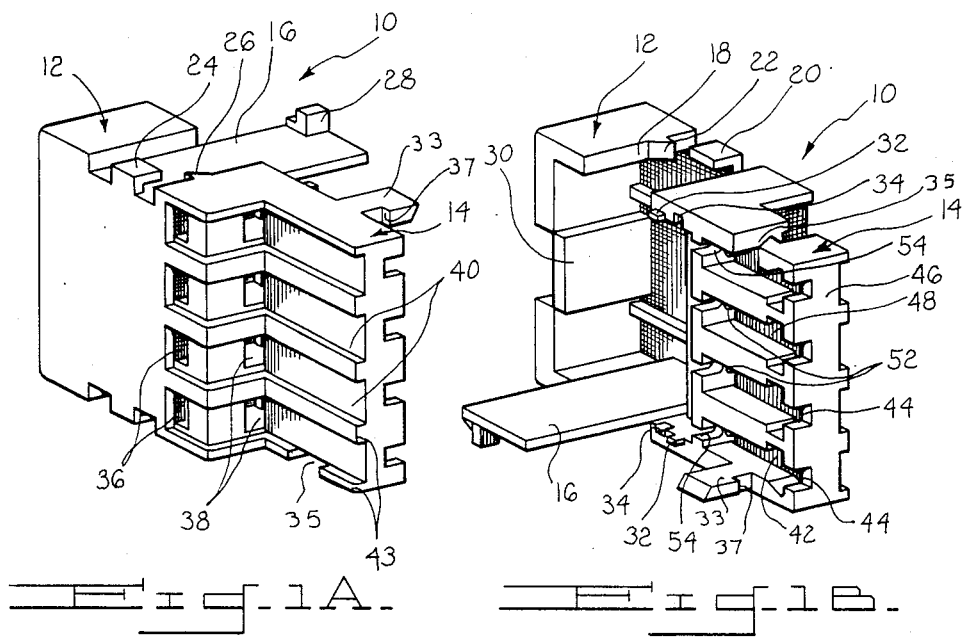
FIGS. 1A and 1B are perspective views of a pair of identical body portions used to form a four position body in accordance with the present invention.

Turning now to FIGS. 1A and 1B, a pair of four position body portions are shown generally at 10. It will be appreciated that the four position body portions (and the two position body portions shown in FIGS. 2A and 2B) are identical molded pieces which are merely oriented in opposed directions to effect a snap-lock and to form a four position (or two position) body as is shown in FIG. 9 (and FIG. 8). Four position body portion 10 includes a first housing section 12 and a second housing or nose portion 14. Four position body portion 10 further includes a snap-out tab 16 which extends laterally from first housing section 12 and which, as will be discussed hereinafter, is adapted for snap-out removal from the unassembled body. Located on the the opposite side of housing section 12 from tab 16 is a space 18. Space 18 includes a first guide member 20 and a first ramp shaped snap-lock member 22. A second guide member or projecting piece 24 and a second snap-lock member 26 are attached to body 10 in positions adjacent snap-out tab 16. Snap-out tab 16 includes a retainer 28. As shown in FIG. 9, retainer 28 is adapted to be guided along guide member 20 and snap-locked and retained by ramp shaped snap-lock member 22. The first housing section 12 of body portion 10 further includes a second rectangular breakout portion 30 along with cooperating extension 32 and recess 34 which are adapted to align body portions 10 during assembly thereof to form the four position body of FIG. 9.

In order to maintain structural integrity in the four position body, body portions 10 may also include a latch 33 with cooperating latch receiving recess 35. Both latch 33 and recess 35 include cooperating projections 37 for maintaining locking engagement (see FIG. 9). It will be appreciated that latch 33 and recess 35 are only for purpose of further enhancing the connecting strength provided by snap-out tabs 16.

Figure 3A:
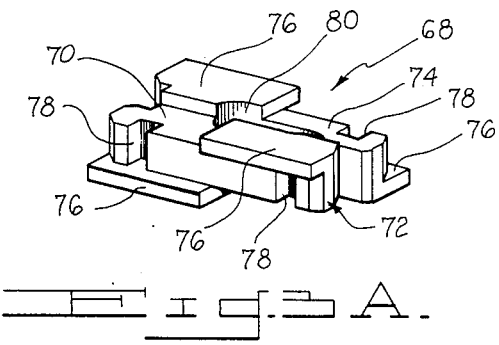
FIGS. 3A and 3B are top and bottom perspective views of an interconnecting grommet used to interconnect the body portions of FIGS. 1 and 2 in accordance with the present invention.
Figure 3B:
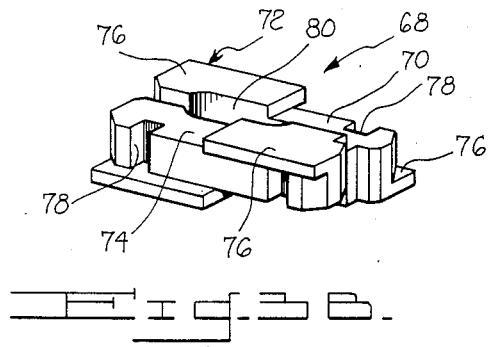
Figure 4A:
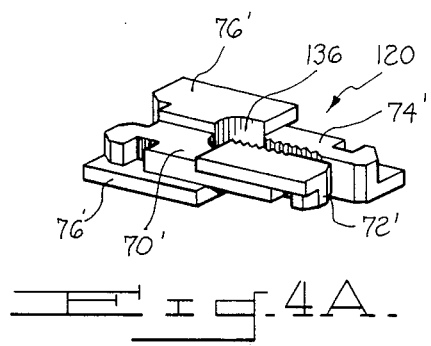
FIGS. 4A and 4B are top and bottom perspective views of a first section of a strain relief plug adapted to attach to the body portions of FIGS. 1 and 2.
Figure 4B:
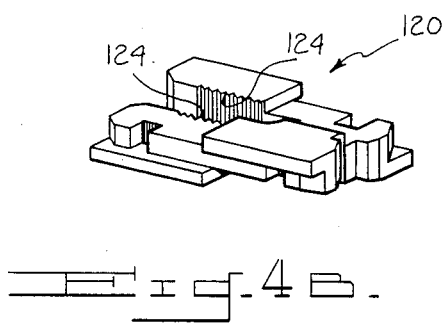

The second housing or nose portion 14 of body portion 10 includes a series of four lateral openings 36 and four longitudinal openings 38 which are transverse to lateral openings 36. As will be discussed in greater detail hereinafter, openings 38 are adapted to receive and retain side wipe contacts as shown in FIGS. 14B and 15. Grooves 40 and support walls 42 are also provided in the nose portion 14 of body portion 10 to position and support the side wipe contacts as shown in FIG. 15. As discussed in U.S. Pat. No. 585,290 with regard to FIGS. 3A and 3B of that prior application, nose portion 14 further includes four apertures 44 on the front face 46 thereof which lead into cavities 48. Each cavity 48 is preferably configured to hold and retain an individual bridge clip as shown generally at 49 in FIG. 14A. Accordingly, cavities 48 are wider at the end nearest apertures 44 so as to accept the divergent ends 50 of each bridge clip. Each cavity 48 also includes a cylindrical projection 52 and slot 54. Projections 52 and slots 54 act as a floor for wire conductors 56 when a bridging clip 49 is pushed down to make a connection, and also provide a hard surface for an insertion tool (not shown) to bear against when wires 56 are cut as in FIG. 14A. Projections 52 also act as a "stop" when connector block terminals (FIG. 18) are inserted into apertures 44 and through cavities 48.

Figures 2A, 2B:
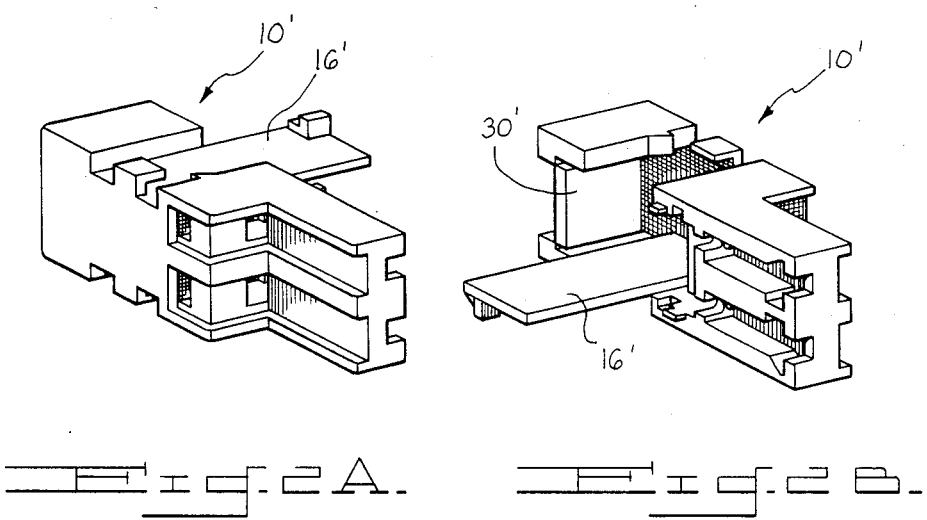
FIGS. 2A and 2B are perspective views of identical body portions used to form a two position body in accordance with the present invention.

Referring now to FIGS. 2A and 2B, a pair of identical two position body portions which each make up one half of a two position body (FIG. 8) is shown generally at 10'. It will be appreciated that the structural configuration of the two position body portions 10' are identical to the structural configurations of the four position body portions shown in FIGS. 1A and 1B except for the fact that it is adapted for two rather than four wires. Accordingly, the same identifying numerals as used in FIGS. 1A and 1B are used in FIGS. 2A and 2B with the addition of a prime.

Turning now to FIGS. 8 and 9, body portions 10 and 10' are respectively oriented in opposite directions (as is in FIGS. 1A, 1B, 2A and 2B) and are brought together to form a snap-lock fit as described above in the discussion of FIGS. 1A and 1B. As a result, a two position body shown generally at 58 in FIG. 8 and a four position body shown generally at 60 in FIG. 9, is formed. These two and four position bodies 58 and 60 are functionally analogous to the two and four position test adapters described in U.S. Pat. No. 4,585,290. As will be discussed in greater detail, these two and four position bodies 58 and 60 comprise the building blocks to form a large number of connector configurations, all of which have an even number of positions.

Still referring to FIGS. 8 and 9, the assembled body portions 10A and 10B which form bodies 58 and 60, include apertures 44 on front face 46 which are sized for receiving the electrical connectors which extend from a telephone terminal block such as the 66 type quick connect block shown in FIG. 18. Thus, when assembled, bodies 58 and 60 include a pair of oppositely disposed snap-out tabs 16 (one snap-out tab being provided from each of the body portions 10 and 10') and a rearwardly positioned breakout portion (shown in FIG. 16 after being removed) which is formed by the two rectangular breakout portions 30 from each of the body portions 10A and 10B. It will be appreciated that by selectively removing breakout tabs 16 and 30, the interior of bodies 58 and 60 may be accessed from up to three positions to permit the attachment of additional component pieces (as well as other bodies) in accordance with the present invention.

In FIG. 10, snap-out tab 16' has been removed from body 58 as indicated by the dotted lines 62. It is clear from a review of the FIGURES that both snap-out tabs 16, 16' and the rear breakout portion are easily removed (or snapped out) because the molded plastic forming the assembled bodies 58 and 60 have a reduced thickness in the boundary area between the tabs (and breakout portion) and the rest of the body. This reduced thickness leads to easy break-out in a manner which is well known to those familiar with plastic molded parts. The removal of tab 16' provides a first access opening 64 into the interior 66 of two position body 58. As will be discussed in detail hereinafter, either an interlocking grommet as shown at 68 in FIGS. 3A and 3B; or a strain relief plug as shown in FIGS. 4A, 4B, 5A and 5B; or a modular jack mounting bracket as shown in FIGS. 6 and 7 may now be attached to two position body 58 at access opening 64.

Two and four position bodies 58 and 60 are easily interconnected to provide larger, even numbered bodies for virtually any particular or desired application. This interconnecting or stacking of bodies 58 and/or 60 is accomplished by use of an interlocking grommet 68 shown in FIGS. 3A and 3B. Interlocking grommet 68 is comprised of a base portion 70 having a pair of cantilevered arms 72 and 74 extending therefrom. Grommet 68 further includes four guide and retaining plates 76, along with four snap-lock members 78 which are similar to the snap-lock members 22 in FIGS. 1 and 2. Finally, a through-hole space 80 is formed by cantilevered arms 72 and 74 to permit wiring to pass therethrough.

In FIG. 11, an interconnecting grommet 68 is shown being loaded and locked onto two position body 58. This is accomplished by sliding interlocking grommet 68 along opposed bearing surfaces 79 and guide plates 76 whereupon snap-lock members 78 will engage and lock onto corresponding snap-lock members 22 on two position body 58. At this point, a second two or four position body 58 or 60 may be similarly attached to interlocking grommet 68 (the second body previously having a snap-out tab 16 being removed therefrom) by sliding the second body 58 or 60 along bearing surface 79 between guide and retaining plates 76 and two position body 58 whereupon a similar snap-locking between the second body 58 or 60 and the interlocking grommet 68 will result. Such an assembly of two distinct bodies utilizing an interlocking grommet 68 are shown in FIGS. 12 and 13. Thus, in FIG. 12, a two position body 58 and a four position body 60 have been attached by an interlocking grommet 68 (not shown) to provide a six position body 82. Similarly, in FIG. 13, a pair of four position bodies 60 have been interconnected by a grommet 68 to form an eight position body 84. It follows then, that by simply removing snap-out tabs 16 from one or both ends of a body 58 or 60, a larger body of even numbered wired positions may be assembled for any number of applications. This particular and important feature of applicant's invention is in distinct contrast to the modular test plug adapter disclosed in U.S. Ser. No. 634,816 wherein only two, four, six or eight position configurations were available. It also follows that this large number of configurations formed from the use of interconnecting grommets in conjunction with two or four position bodies may be achieved utilizing only three different molded pieces; that is, a pair of four position body portions 10, a two position body portion 10' and an interconnecting grommet 68. The potential cost savings and ease of manufacture of the present invention is thus quite evident from the foregoing remarks and description.

Referring again to FIG. 10, after removal of a snap-out tab 16', the present invention contemplates not only the attachment of an interconnecting grommet such as shown at 68, but alternatively, other component parts may similarly be attached to bodies 58 or 60. Such other component parts include the mounting brackets of FIGS. 6 and 7 and the strain relief plugs of FIGS. 4 and 5. Referring first to FIGS. 6A and 6B, a mounting bracket suitable for housing an eight position modular jack is shown generally at 86. Mounting bracket 86 has a U-shape including a front face 88 and two oppositely disposed springy or flexible arms 90 extending at a transverse direction from front face 88. Extending outwardly from each arm 90 of U-shape bracket 86 is a snap-locking clip 92 which effects attachment to an exposed access opening in a two or four position access body. It will be appreciated that the space 94 formed between arms 90 and front face 88 are sized to accept an eight position modular jack; such a jack being slideably fit into the interior space 94 and being retained therein by a pair of opposed retaining brackets or flanges 96 which depend from arms 90 as shown in FIGS. 6A and 6B. A large opening 98 is provided through front face 88 of bracket 86 to permit access between the modular jack (FIG. 16) which has been slideably fit into bracket 86 and a modular plug (not shown) which is to be connected to the modular jack. Each arm 90 also contains a rectangular opening 100 therethrough and a pair of oppositely disposed slots 102 positioned between rectangular opening 100 and front face 88. Rectangular opening 100 and slots 102 cooperate with corresponding extensions molded into a conventional eight position modular jack to hold and retain the jack within the interior space 94 of bracket 86 (see FIG. 16).

In FIGS. 7A and 7B, a mounting bracket suitable for holding and mounting a two, four or six position modular jack is shown generally at 104. Mounting bracket 104 is essentially of the same size and shape and includes similar structural features as mounting bracket 86 in FIGS. 6A and 6B. The primary difference between mounting brackets 104 and 86 is in the means for retaining the respective modular jacks therein. Thus, while mounting bracket 86 employs rectangular opening 100, slots 102 and depending retaining member 96 to secure an eight position modular jack, mounting bracket 104 utilizes depending retainer members 96' in conjunction with a pair of oppositely disposed side walls 106 to firmly hold a two, four or six position modular jack therein (see FIG. 16). The other significant difference between mounting bracket 104 and mounting bracket 86 is the presence in mounting bracket 104 of rectangularly shaped opening 108 for accessing a two, four or six position modular plug (not shown). All of the structural differences arises from the well known fact that the outer configuration of an eight position modular jack differs significantly from the outer configuration of a two, four or six position modular jack. Accordingly, the respective mounting brackets are tailored to the specific needs of the modular jack which is to be held therein. As the remaining structural features of mounting bracket 104 are the same as has been described earlier with respect to mounting bracket 86, no further discussion is deemed necessary with identical structure FIG. 7A and 7B having similar identifying numerals with the addition of a prime.

Figure 16:
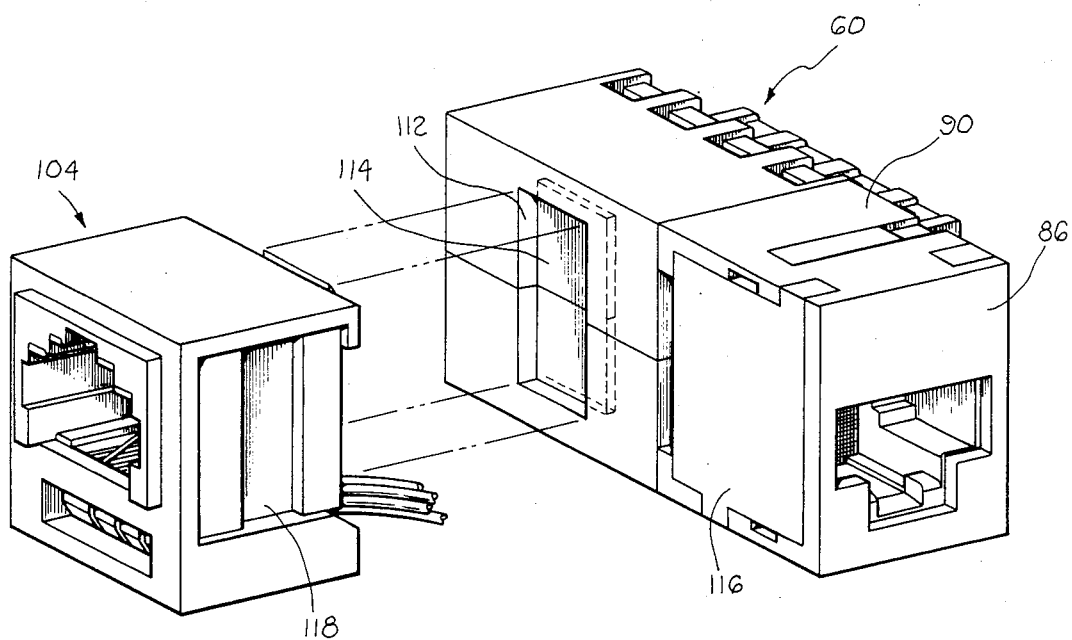
FIG. 16 is a perspective view of the four position body of FIG. 9 having brackets with modular plugs being attached thereto.

Turning now to FIG. 16, a four position body such as shown at 60 in FIG. 9, is shown in FIG. 16 after a first snap-out tab 16 has been removed (such as shown in FIG. 10) and the rectangular breakout portion 30 (not shown) has been removed to provide a second access opening 112 and thereby expose the interior 114 of four position body 60. In FIG. 16, mounting bracket 86 having an eight position modular jack 116 snap-locked therein has been snap-locked into a first access opening of four position body 60. This is achieved by snap-lock clips 92 slightly flexing upon contact with the access opening and then springing back so as to grip and hold onto body 60. Similarly, two, four or six position modular bracket 104 having a two, four or six position modular jack 118 therein is shown prior to being attached to second access opening 112 on body 60. It will be appreciated that if desired, a third mounting bracket having a modular jack therein could additionally be mounted onto four position body 60 at the location of the second snap-out tab (not shown).

Figure 5A:
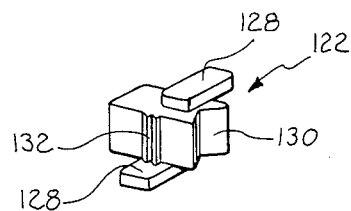
FIGS. 5A and 5B are top and bottom perspective views of a second portion of a strain relief plug for use in conjunction with the first portion shown in FIGS. 4A and 4B.
Figure 5B:
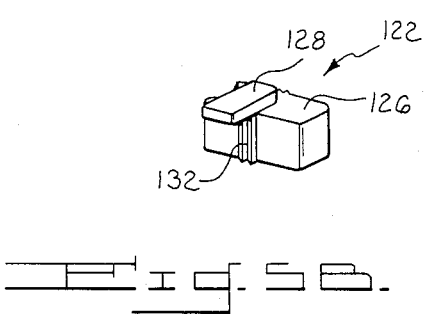

Turning now to a joint discussion of FIGS. 4A, 4B, 5A, 5B and 17, yet another important component for use in conjunction with the telephone terminal block access system of the present invention is shown. This component is a strain relief grommet and plug and consists of two pieces including the strain relief grommet 120 (FIGS. 4A and 4B) and the strain relief plug 122 (FIGS. 5A and 5B). Strain relief grommet 120 has an outer configuration which is substantially similar to interlocking grommet 68 shown in FIGS. 3A and 3B. However, two significant differences exist. First, in an preferred embodiment, strain relief grommet 120 has an overall thickness which is slightly less than the thickness of interlocking grommet 68. The second difference resides in the interior surfaces of cantilevered arm 72' and 74'. Unlike the smooth surface of interlocking grommet 68, strain relief grommet 120 includes opposed serrated edges 124 positioned on the interior surfaces of cantilevered arms 72' and 74'. Strain relief plug 122 comprises a block 126 having a pair of extending guide plates 128 on opposed faces of block 126. Block 126 preferably includes a U-shaped or arcuate shaped end section 130 on one end thereof and oppositely disposed serrated areas 132 on opposed side surfaces of block 126.

Figure 17:
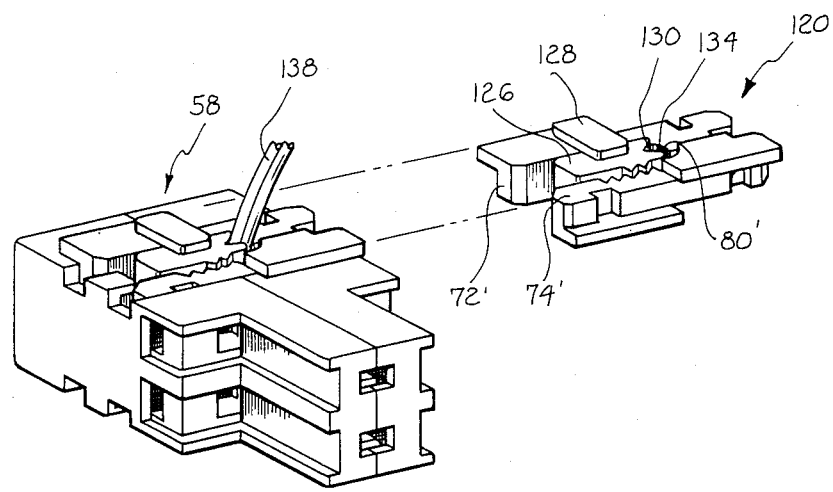
FIG. 17 is a perspective view of a two position body of FIG. 8 having a strain relief plug being attached thereto.

Referring now to FIG. 17, strain relief plug 122 is sized to slide within the interior section between cantilever arms 72' and 74', being guided therethrough by guide plates 128. It will be appreciated that serrated portions 132 on block 126 cooperate with and mesh to serrated portions 124 on arms 72' and 74' to provide a variable sized opening 134 which is defined between end section 130 of block 126 in the area identified at 136 in FIGS. 4A and 4B; area 136 being defined by the junction between the base 70' and arms 72' and 74'. In FIG. 17, a strain relief grommet and plug 120 and 122 are shown prior and subsequent to being attached onto the access opening 64 of a two position body 58 such as is shown in FIGS. 8-10. Strain relief grommet and plug 120, 122 act to clamp onto and hold a cable 138 which is entering or exiting interior space 66 of body 58. Thus, cable 138 is firmly held between V or arcuate shaped end section 130 and bearing surface 136 of grommet 120. It will be appreciated that any size cable may be used in this manner by simply varying the opening 134 by movement of plug 122 and its serrated section 132 along corresponding serrated surfaces 124 of arms 72' and 74'. If desired, another two or four position body 58 or 60 may now be snap-locked onto strain relief grommet 120 in the same manner as discussed with regard to interlocking grommet 68 in FIGS. 11-13.

As discussed earlier with regard to earlier filed U.S. Ser. No. 634,816, one drawback with the test adapters of the prior application is that they are not well suited for effecting connections with adjacent lateral rows of terminals from a connector block, but are only adapted to interconnect a single vertical row of terminals from the block. Referring now to FIGS. 14B and 15, the present invention improves upon this disadvantage of the prior application by the use of one or more side wipe contacts shown generally at 140. Each side wipe contact 140 includes a resilient springy portion 142 having a longitudinal slit 144 therethrough (which is adapted to accept a terminal from a connector block) and a lower portion 146 having a slot 148 partially therethrough for connection to leads from a modular jack or other device. As discussed briefly above, side wipe contacts 140 are received and retained in openings 38 of a body portion 10 or 10' (for example, four position body 60 shown in FIG. 15). Grooves 40 and support walls 42 on four position body 60 act to position and support the side wipe contact 140 after insertion thereon. As is clear from FIG. 15, a connector body such as shown at 60 which is provided with side wipe contacts on the opposed lateral sides of nose portions 14, will effect electrical contact with three adjoining lateral rows of terminals extending from a connector block such as the connector block shown in FIG. 18. This is a marked improvement over prior art test adapters wherein only a single vertical row of terminals could be connected at any given time.

Turning now to FIG. 18, a example of several embodiments of the multicomponent access system in accordance with the present invention is shown. In FIG. 18, a well known type 66 quick connect terminal block is shown generally at 150. Connector block 150 comprises a rigid plastic housing 152 having a plurality of quick connect type terminals 154 extending upwardly therefrom. Still referring to FIG. 18, a first configuration of an access system for accessing terminals or connectors on a terminal block 150 is shown generally at 156 and comprises a pair of interconnected four position bodies such as is shown at 84 in FIG. 13 having an eight position modular jack 116 and bracket 86 connected on one side thereof such as was shown in FIG. 16. Still another embodiment of the present invention is shown at 158 and comprises an interconnected two and four position body such as is shown at 82 in FIG. 12. Still referring to FIG. 18, a two position body such as 58 in FIG. 8 is shown having a two, four or six position modular jack 118 and associated bracket 104 attached on the top surface thereof. Adjacent to this two position body 168 is a four position body 170 which has also been connected to terminals 154 of block 150.

It will be appreciated that the present invention does not necessarily contemplate the use of a modular jack for interfacing testing and other types of equipment. Thus, for example, yet another embodiment of a multicomponent telephone block access system of the present invention is shown at 172 wherein wires leading from the bridge clips, side wipe contacts or other electrical contacts located interior of the bodies are connected via wire leads to other types of connector jacks such as the 25 pair connector shown generally at 174 in FIG. 18. The fact that the present invention may utilize all types of jacks including modular jacks; and the fact that the access system of the present invention may also be simply hard wired to other devices is an important feature. Moreover, this feature is an improvement over the modular test adapter of U.S. Ser. No. 634,816 which was essentially restricted to use of a modular jack.

In view of the foregoing description of the present invention, particularly FIG. 18, it is clear that the present invention comprises a system which is adapted to form an almost limitless number of configurations which access connectors or terminals on terminal blocks for a myriad of applications. This system of the instant invention consists of six or seven molded interlocking snap on parts which are relatively easy and inexpensive to manufacture and can be assembled into a configuration suitable for almost any type of application. As has been discussed hereinabove, the multicomponent access system of the present invention is an improvement upon and overcomes many of the deficiencies with regard to the modular test adapter of U.S. Ser. No. 634,816; while also providing many features adapted for applications which cannot be accomplished with the modular test adapter disclosed in the earlier application.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A system for accessing the wiring of a telephone terminal bock of the type having a plurality of electrical connectors extending thereform comprising:

a pair of identical body portion sub-assemblies adapted to be spaced in opposed orientations and then assembled to effect a snap-lock fit and thereby define an access body, each of said body portion sub-assemblies comprising:

a first housing section having opposed front and back surfaces, opposed first and second end surfaces and a side surface communicating with and being transverse to said front, back and first and second end surfaces, the volume between said side surface, front, back and end surfaces defining a recess for receiving electrical wiring;

said first end surface having tab means laterally extending beyond said first end surface, and said second end surface having a first space therein, said tab means being adapted for permanent removal from said first end surface and by such permanent removal forming a second space in said first end surface, said second space being adapted to receive additional component pieces of said system in interlocked attachment to said access body;

said tab means including means for snap-locking onto the first space of another body portion sub-assembly;

said first space including means for snap-locking onto the tab means of said another body portion sub-assembly;

a second housing section connected to and extending from said front surface of said first housing section, said second housing section defining a nose portion terminating at a planar surface and having a plurality of apertures therein, each of said apertures leading to a cavity, each of said cavities being adapted to hold and retain an electrical terminal clip therein.

2. The system of claim 1 wherein said first space includes means for receiving the tab means of said another body portion sub-assembly and wherein said first space snap-locking means and said first space receiving means includes:

a first guide member attached to the interface between said second end surface and said side surface; and a first ramped shaped snap-lock member positioned within said first space.

3. The system of claim 1 wherein said first housing section includes means for orienting said tab means onto the first space of said another body and wherein said tab means snap-locking means and said tab means orienting means includes:
- a second guide member attached to the interface between said first end surface and said side surface;
- a second ramped shaped snap-lock member; and
- a retainer which is adapted to be retained by a first ramped shaped snap-lock member on another body portion sub-assembly.

4. The system of claim 2 wherein said first housing section includes means for orienting said tab means onto the first space of said another body and wherein said first tab means snap-locking means and said tab means orienting means includes:
- a second guide member attached to the interface between said first end surface and said side surface;
- a second ramped shaped snap-lock member; and
- a retainer which is adapted to be retained by a first ramped shaped snap-lock member on another body portion sub-assembly.

5. The system of claim 1 including:
- a break-out portion centrally located in said back surface.

6. The system of claim 1 including:
- at least one extension means extending from said body portion sub-assembly; and
- at least one groove in said body portion sub-assembly;
- wherein said extension and groove from one body portion sub-assembly respectively mate with a groove and extension from another body portion sub-assembly whereby said pair of body portion sub-assemblies are aligned during assembly thereof into an access body.

7. The system of claim 1 wherein said nose portion includes two apertures therein.

8. The system of claim 1 wherein said nose portion includes four apertures therein.

9. The system of claim 1 including a plurality of access bodies; and
- means for interconnecting said access bodies.

10. The system of claim 9 wherein said interconnecting means comprises:
- base means having first and second cantilevered arms extending therefrom, said arms being approximately parallel and defining a through-hole space therebetween.

11. The system of claim 10 wherein said interconnecting means further comprises:
- guide and retaining plate means; and snap-lock members associated with said base means and first and second arms;
- wherein said guide and retaining plate means and said snap-lock members are adapted to and lock with corresponding receiving and snap-locking means of said first or second space.

12. The system of claim 1 including:
- means for mounting a two, four, six or eight position modular jack onto said access body;
- said bracket means being adapted to snap-mount onto said first or second space.

13. The system of claim 12 wherein said bracket means comprises:
- a u-shape bracket having a base and two oppositely disposed flexible arm extending in a direction transverse to said base;
- snap-lock means extending outwardly from each flexible arm, s snap-lock means being adapted to snap-lock within said first or second space;
- at least one modular jack access opening through said base of said u-shape bracket; and
- means for retaining a modular jack in the volume defined between said base and arms.

14. The system of claim 13 wherein:
- said volume between said base and arm is configured for an eight position modular jack; and
- said modular jack access opening is configured for an eight position modular jack.

15. The system of claim 13 wherein:
- said volume between said base and arm is configured for a two, four or six position modular jack; and
- said modular jack access opening is configured for a two, four or six position modular jack.

16. The system of claim 12 wherein said means for retaining a modular jack comprises:
- at least one flange depending from at least one of said arms in a direction transverse to said arms.

17. The system of claim 5 including:
- bracket means for mounting a two, four, six or eight position modular jack onto said access body;
- said bracket means being adapted to snap-mount onto said firt or second space.

18. The system of claim 17 wherein said bracket means comprises:
- a u-shape bracket having a base and two oppositely disposed flexible arm extending in a direction transverse to said base;
- snap-lock means extending outwardly from each flexible arm, said snap-lock means being adapted to snap-lock within said first or second space;
- at least one modular jack access opening through said base said u-shape bracket; and
- means for retaining a modular jack in the volume defined between said base and arms.

19. The system of claim 18 wherein:
- said volume between said base and arm is configured for an eight position modular jack; and
- said modular jack access opening is configured for an eight position modular jack.

20. The system of claim 18 wherein:
- said volume between said base and arm is configured for a two, four or six position modular jack; and
- said modular jack access opening is configured for a two, four or six position modular jack.

21. The system of claim 17 wherein said means for retaining a modular jack comprises:
- at least one flange depending from at least one of said arms in a direction transverse to said arms.

22. The system of claim 1 including:
- strain relief means, said strain relief means being adapted to received by and snap-locked with said first or second space.

23. The system of claim 22 wherein said strain relief means comprises two parts, said first part including:
- a base means having first and second cantilevered arms extending therefrom, said arms being approximately parallel and defining a through-hole space therebetween;
- and said second part including;
- a plug means sized to slide within said through-hole space to define a varyingly sized opening.

24. The system of claim 23 wherein said first part of said strain relief means further includes:
- inwardly facing opposed serrated edges along at least a portion of said parallel arms; and
- wherein said second part further includes;

outwardly facing opposed serrated edges along at least a portion of opposed sides of said plug means; and wherein said respective serrated edges of said first and second parts are adapted to intermesh whereby said plug means will be spaced from said base means of said first part to reflect said varyingly sized opening.

25. The system of claim 23 wherein plug means has an arcuate or u-shape along a first end thereof, said first end being disposed across from said base of said first part.

26. The system of claim 23 wherein said strain relief means further comprises:
guide and retaining plate means; and
snap-lock members associated with said base means and first and second arms wherein said guide and retaining plate means and said snap-lock members are adapted to and lock with corresponding receiving and snap-locking means of said first or second space.

27. The system of claim 1 including:
a plurality of openings through said front face of said first housing section adjacent said second housing section.

28. The system of claim 27 including:
a plurality of longitudinal grooves in said second housing section, each of said grooves respectively communicating with each of said openings.

29. The system of claim 1 including:
side wipe contact means disposed through at least one of said openings, a first end of said side wipe contact means being internal of said access body and a second end of said side wipe contact means being external of said access body.

30. The system of claim 28 including:
side wipe contact means disposed through at least one of openings, a first end of said side wipe contact means being internal of said access body and a second end of said side wipe contact means being external of said access body;
said side wipe contact means being disposed within said grooves.

31. The system of claim 29 wherein said side wipe contact means comprises:
an electrically conductive member terminating in a curved resilient section, said curved, resilient section being located at said second end of said side wipe contact.

32. The system of claim 1 wherein:
said second housing section includes a latch extending laterally therefrom and a latch receiving recess oppositely disposed from said latch; and
said latch and said latch receiving recess including means for maintaining mutual locking engagement.

33. The system of claim 8 wherein:
said second housing section includes a latch extending laterally therefrom and a latch receiving recess oppositely disposed from said latch; and
said latch and said latch receiving recess including means for maintaining mutual locking engagement.

* * * * *